(12) United States Patent
Uzawa et al.

(10) Patent No.: US 12,518,324 B2
(45) Date of Patent: Jan. 6, 2026

(54) QUOTATION SYSTEM, QUOTATION PROGRAM, AND CONTROL METHOD

(71) Applicant: MISUMI CORPORATION, Tokyo (JP)

(72) Inventors: Hiroyuki Uzawa, Tokyo (JP); Yasuhiro Matsumoto, Tokyo (JP)

(73) Assignee: MISUMI CORPORATION, Tokyo (JP)

( * ) Notice: Subject to any disclaimer, the term of this patent is extended or adjusted under 35 U.S.C. 154(b) by 0 days.

(21) Appl. No.: 18/576,058

(22) PCT Filed: Jun. 29, 2022

(86) PCT No.: PCT/JP2022/025949
§ 371 (c)(1),
(2) Date: Jan. 2, 2024

(87) PCT Pub. No.: WO2023/282141
PCT Pub. Date: Jan. 12, 2023

(65) Prior Publication Data
US 2024/0311933 A1    Sep. 19, 2024

(30) Foreign Application Priority Data
Jul. 8, 2021 (JP) .................................. 2021-113472

(51) Int. Cl.
*G06Q 30/00* (2023.01)
*G06F 30/17* (2020.01)
(Continued)

(52) U.S. Cl.
CPC ............. *G06Q 50/04* (2013.01); *G06F 30/17* (2020.01); *G06Q 30/0283* (2013.01); *G06F 2119/18* (2020.01)

(58) Field of Classification Search
CPC ............................. G06Q 30/0283; G06F 30/17
See application file for complete search history.

(56) References Cited

U.S. PATENT DOCUMENTS

| 6,804,568 B1 | 10/2004 | Miyazaki et al. |
| 8,295,971 B2 | 10/2012 | Krantz |

(Continued)

FOREIGN PATENT DOCUMENTS

| DE | 112021000099 T5 | 5/2022 |
| JP | 2001084018 A | 3/2001 |

(Continued)

OTHER PUBLICATIONS

Hase, Vaibhav J., et al. "Complex hole recognition from CAD mesh models." Int J Manag Technol Eng 8.9 (2018): 1102-1119.*

(Continued)

*Primary Examiner* — Kathleen Palavecino
(74) *Attorney, Agent, or Firm* — Leason Ellis LLP; Jordan Garner; Mitsuhiro Haraguchi

(57) ABSTRACT

A quotation system 100, that receives shape data D1 of an article from a client terminal 40 of a user and provides quotation information of the article, has: a data acquisition section 22A that acquires the shape data of the article including a hole element; a detection section 22B that detects surface information of the hole element among pieces of information assigned to the shape data; an attribute setting section 22C that sets a hole attribute corresponding to the detected surface information to the hole element with reference to association information D2 in which surface information able to be assigned to the shape data and the hole attribute indicating an attribute of the hole element are associated for each user; and a quotation section 22D that creates the quotation information based on the set hole attribute and the shape data.

11 Claims, 13 Drawing Sheets

(51) Int. Cl.
*G06Q 30/0283* (2023.01)
*G06Q 50/04* (2012.01)
*G06F 119/18* (2020.01)

(56) References Cited

U.S. PATENT DOCUMENTS

| | | |
|---|---|---|
| 2003/0174140 A1 | 9/2003 | Shima |
| 2011/0054655 A1 | 3/2011 | Krantz |
| 2022/0148277 A1* | 5/2022 | Aso .................. G06T 19/00 |
| 2022/0343378 A1 | 10/2022 | Owa et al. |

FOREIGN PATENT DOCUMENTS

| | | |
|---|---|---|
| JP | 2001101284 A | 4/2001 |
| JP | 2003271677 A | 9/2003 |
| JP | 200525387 A | 1/2005 |
| JP | 2008158740 A | 7/2008 |
| JP | 2016212618 A | 12/2016 |
| JP | 20185287 A | 1/2018 |

OTHER PUBLICATIONS

Notice of Reason for Refusal issued Dec. 12, 2023 for the corresponding Japanese Patent Application No. 2021-113472 (6 pages including English translation).
Decision to Grant a Patent issued Apr. 2, 2024 for the corresponding Japanese Patent Application No. 2021-113472 (5 pages including English translation).

* cited by examiner

FIG. 5

| < | BASIC INFORMATION | TREE VIEW |

ARTICLE A

- COMMON ITEM
  - EXTERNAL DIMENSION
    - X 100mm
    - Y 60mm
    - Z 20mm
  - Top
    - TAP HOLE (COARSE THREAD)
      - 4 × M10
  - Bottom
  - Front
  - Back
  - Left
  - Right

ARTICLE A    1  × 4,980YEN  =4,980YEN  (6 DAYS)

(MODEL NUMBER) _____

CONFIRM QUOTATION

SHIP DATE ----Y--M--D
ACTUAL WORK DAYS -DAYS

TOTAL  YEN

| PRINT | OUTPUT ORDER LIST | PROCEED TO ORDER |

FIG. 12

| < | BASIC INFORMATION | TREE VIEW |

ARTICLE A

⊟─⚠ PLEASE CONFIRM CONDITIONS
　└⊟─⊗ THIS IS THE HOLE TYPE INCLUDING A
　　　　COMBINATION THAT CANNOT BE SUPPORTED
　　　　　　M1

⊟─ COMMON ITEM
　└⊟─ EXTERNAL DIMENSION
　　　├ X 100mm
　　　├ Y 60mm
　　　└ Z 20mm

⊟─ Top
　└⊟─ TAP HOLE
　　　└ 4 × M10

ARTICLE A　　1　× 4,980YEN　=4,980YEN　(6 DAYS)

(MODEL NUMBER) _____

CONFIRM QUOTATION

SHIP DATE ----Y--M--D
ACTUAL WORK DAYS -DAYS

TOTAL　YEN

| PRINT | OUTPUT ORDER LIST | PROCEED TO ORDER |

FIG. 13

| < | BASIC INFORMATION | TREE VIEW |

ARTICLE A

```
┌─ COMMON ITEM
│   ┌─ EXTERNAL DIMENSION
│   ├─ X  100mm
│   ├─ Y  60mm
│   └─ Z  20mm
├─ Top
│   ┌─ TAP HOLE
│   │  (COARSE THREAD)
│   └─ 4 × M10
└─ UNSET COLOR
    └─ 2 × φ3 ▼ 5
```

M2: [R: 148, G: 63, B: 175] IS SET FOR THE HOLE COLOR. IF YOU WANT TO AUTOMATICALLY SET THE HOLE TYPE, REGISTER THE COLOR ON THE SETTING SCREEN

M3:
DESIGNATED COLORS
TAP HOLE (COARSE THREAD)   [R:223, G:34, B:34]
TAP HOLE (FINE THREAD)     [R:50, G:50, B:50]
PRECISION HOLE             [R:32, G:32, B:223]
INSERT HOLE                [R:223, G:32, B:32]

ARTICLE A     1   × 4,980YEN   =4,980YEN   (6 DAYS)

(MODEL NUMBER) _____ 15

| CONFIRM QUOTATION | 14

SHIP DATE ----Y--M--D
ACTUAL WORK DAYS -DAYS 16          17              18     TOTAL    YEN
| PRINT | | OUTPUT ORDER LIST |   | PROCEED TO ORDER |

QUOTATION SYSTEM, QUOTATION PROGRAM, AND CONTROL METHOD

CROSS-REFERENCE TO RELATED PATENT APPLICATIONS

This application is a U.S. National Phase Application under 35 U.S.C. § 371 of International Patent Application No. PCT/JP2022/025949 filed on Jun. 29, 2022 and claims the benefit of priority to Japanese Patent Application No. 2021-113472 filed on Jul. 8, 2021, the contents of all of which are incorporated herein by reference in their entireties. The International Application was published in Japanese on Jan. 12, 2023 as International Publication No. WO 2023/282141 under PCT Article 21(2).

FIELD OF THE INVENTION

The present invention relates to a quotation system for setting a hole attribute to a hole element, a quotation program thereof, and a control method thereof.

BACKGROUND OF THE INVENTION

U.S. Pat. No. 8,295,971B discloses a configuration in which a hole capable of receiving tapping machining is identified in a computer system. In such a computer system, a CAD file of a customer for a custom part to be formed is received, and the CAD file is analyzed in response to the response of the customer to a basic query, thereby identifying a hole capable of receiving tapping machining. Then, a suitable available thread size is automatically selected for each identified hole. Thereafter, the customer is automatically notified of the result of the tapping analysis. In addition, JP2001-084018A discloses a three-dimensional CAM device including a recognition unit that recognizes a portion requiring a process based on a color attribute added to three-dimensional CAD data.

CITATION LIST

Patent Literature

Patent Literature 1: U.S. Pat. No. 8,295,971B
Patent Literature 2: JP2001-084018A

Technical Problem

A hole element may be formed in an article for which a user desires a quotation. In this case, a hole attribute of the hole element (for example, the type of hole such as a tap hole) has an influence on the quotation result. For example, the price of the article is different between an article in which a drill hole is formed and an article in which a tap hole is formed. Therefore, the user is required to designate the hole attribute of the hole element in shape data (for example, three-dimensional CAD data) representing the shape of the article. In addition, in JP2001-084018A, the three-dimensional CAD device and the three-dimensional CAM device share color contrast information. Therefore, the user who creates the three-dimensional CAD data cannot change the color contrast information without the consent of the manufacturer who owns the three-dimensional CAM device. Therefore, the user has a limitation that it is not possible to freely set information (for example, color) associated with the hole attribute.

SUMMARY OF THE INVENTION

Solution to Problem

According to an aspect of the present invention, there is provided a quotation system that receives shape data of an article from a client terminal of a user and provides quotation information of the article, the quotation system comprising: a data acquisition section that acquires the shape data of the article including a hole element; a detection section that detects surface information of the hole element among pieces of information assigned to the shape data; an attribute setting section that sets a hole attribute corresponding to the detected surface information to the hole element with reference to association information in which surface information able to be assigned to the shape data and the hole attribute indicating an attribute of the hole element are associated for each user; and a quotation section that creates the quotation information based on the set hole attribute and the shape data.

Further, according to another aspect of the present invention, there is provided a quotation program of a quotation system that includes a computer, and receives shape data of an article from a client terminal of a user and provides quotation information of the article, the quotation program causing the computer to function as: a data acquisition section that acquires the shape data of the article including a hole element; a detection section that detects surface information of the hole element among pieces of information assigned to the shape data; an attribute setting section that sets a hole attribute corresponding to the detected surface information to the hole element with reference to association information in which surface information able to be assigned to the shape data and the hole attribute indicating an attribute of the hole element are associated for each user; and a quotation section that creates the quotation information based on the set hole attribute and the shape data.

Further, according to still another aspect of the present invention, there is provided a control method of a quotation system that receives shape data of an article from a client terminal of a user and provides quotation information of the article, the control method comprising: acquiring the shape data of the article including a hole element; detecting surface information of the hole element among pieces of information assigned to the shape data; setting a hole attribute corresponding to the detected surface information to the hole element with reference to association information in which surface information able to be assigned to the shape data and the hole attribute indicating an attribute of the hole element are associated for each user; and creating the quotation information based on the set hole attribute and the shape data.

Thus, it is possible to automatically set the hole attribute of a hole element based on shape data received from a client terminal of a user, and increase the degree of freedom in setting association information of the hole element by the user.

BRIEF DESCRIPTION OF THE DRAWINGS

FIG. 5 is a schematic diagram illustrating an example of a quotation screen.

FIG. 12 is a schematic diagram illustrating a warning message according to a second embodiment.

FIG. 13 is a schematic diagram illustrating a proposal message according to a third embodiment.

DETAILED DESCRIPTION OF THE INVENTION

Hereinafter, exemplary embodiments for carrying out the present invention will be described in detail with reference to the drawings. However, the dimensions, materials, shapes and relative positions of the components described in the following embodiments can be arbitrary set and can be changed according to the configuration of an apparatus or a method to which the present invention is applied or to various conditions. Unless otherwise specified, the scope of the present invention is not limited to the embodiments specifically described below.

First Embodiment

Figure 1:
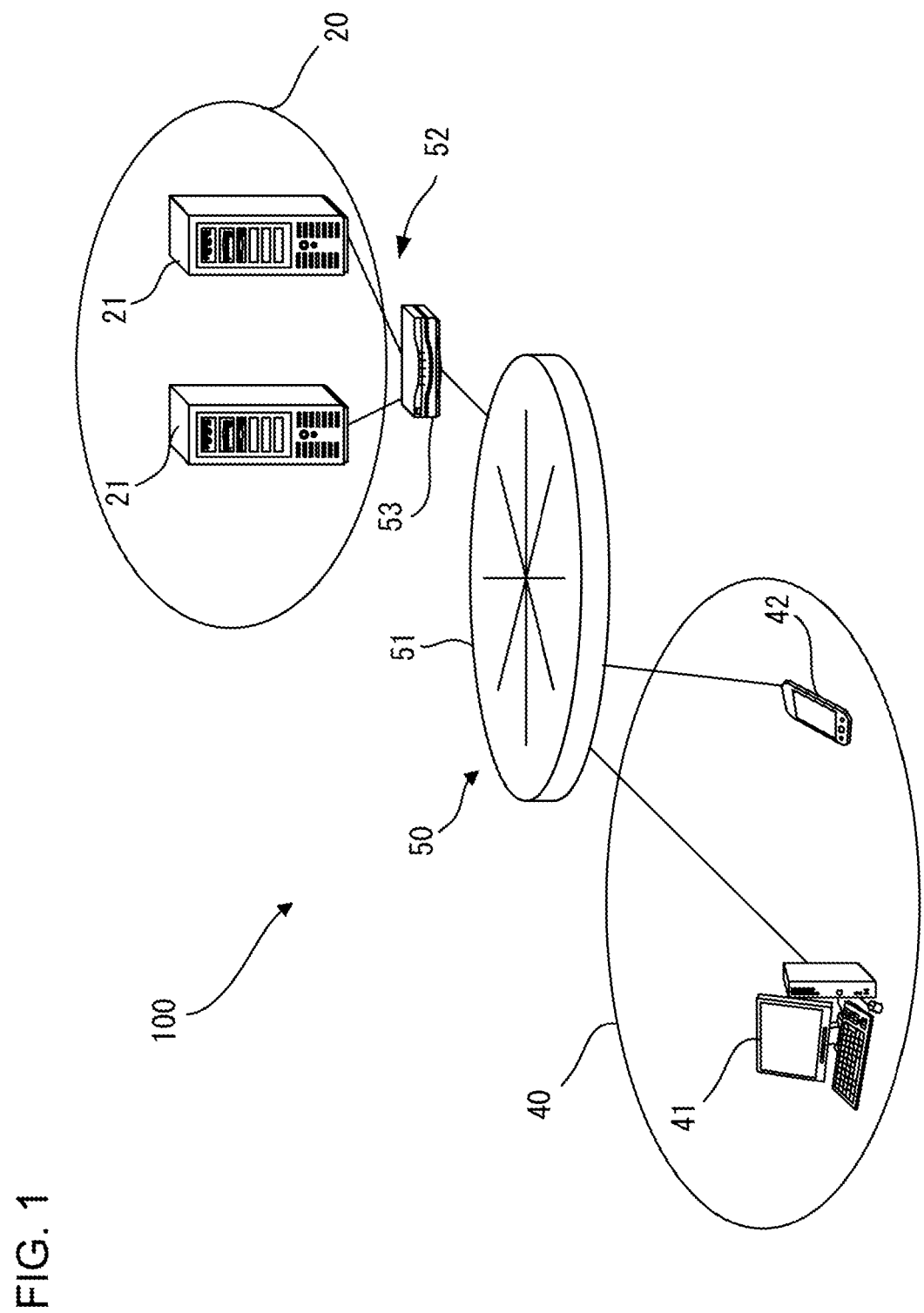
FIG. 1 is a schematic configuration diagram of an entire quotation system.

FIG. 1 illustrates a quotation system 100 that receives shape data D1 (FIG. 3) of an article from a client terminal 40 of a user and provides quotation information of the article. For example, the user transmits the shape data D1 of an article including a hole element from the client terminal 40. Then, a server 20 of the quotation system 100 receives the shape data D1 from the client terminal 40 and stores the shape data D1. Incidentally, the article itself may be a finished product having one integrated function, or may be one article incorporated into a finished product or an assembly including a plurality of components. Further, the article includes a unit, a jig, a device, and equipment in which a plurality of components are combined.

As an example, the hole element is a hole formed in an article, and includes a hole obtained by being machined. For example, the hole elements include a precision hole, a tap hole, a blind hole, a through hole (or a run through hole), a straight hole, a drill hole, a round hole, an insert hole, a counterbore hole, a bolt hole, a countersunk hole (or a countersink hole), a stepped hole, a tapered hole, a chamfered hole, a slot, a square hole, an oblique hole, a notch. Incidentally, the precision hole is a hole that requires high precision for fitting. In addition, the tap hole includes a tap hole for a fine thread and a tap hole for a coarse thread.

The shape data D1 is three-dimensional computer aided design (CAD) data representing the shape of an article as an example, and may include information such as dimensions and a position of an element constituting the article. The element includes the hole element, and is, for example, a portion constituting an article, such as a hole, an axis, a step, a notch, a corner, a plane, and a ridge line. The element also includes a shape obtained by machining. Incidentally, the shape data D1 may be any data including the shape of the article, and may be two-dimensional CAD data. In addition, different types of hole elements can be distinguished by a type of hole (also referred to below as a hole type) as a hole attribute indicating an attribute of the hole element. Incidentally, in addition to the hole type, examples of the hole attribute may include a material, surface processing, a hole diameter tolerance, an effective depth (or a length of a complete thread), a slot width tolerance, an external dimension tolerance, and a surface roughness related to the hole. However, in the following description, an example in which the hole attribute is the hole type will be described.

The quotation system 100 is configured as a network system or a client server system which includes a server 20 as a quotation server. The server 20 functions as a server device, and is configured as one logical server device by combining, for example, server units 21 as a plurality of computers. However, the server 20 may be configured by a single server unit 21. Alternatively, the server 20 may be logically configured by using cloud computing. The server 20 provides the client terminal 40 or a user of the client terminal 40 with various services including an article quotation service. The services include a distribution service for distributing a program or data to the client terminal 40 via a network 50 and a storage service for storing data received from the client terminal 40. The distribution service is, for example, a service that distributes data for update.

The client terminal 40 is a computer device capable of a network connection. For example, the client terminal 40 includes a stationary or book type personal computer 41, and a portable tablet terminal device 42. The client terminal 40 further includes a mobile terminal device such as a portable phone (including a smartphone). The client terminal 40 can cause the user to enjoy various services provided by the server 20 by implementing various types of computer software. In addition, the client terminal 40 can be connected to the server 20 via the predetermined network 50. A case where the client terminal 40 is a personal computer 41 will be described below.

The network 50 is configured such that each client terminal 40 can be connected to the server 20. As an example, the network 50 is configured to realize network communication by using a TCP/IP protocol. Specifically, a local area network (LAN) 52 connects the server 20 and the Internet 51. The Internet 51 as a wide area network (WAN) is connected to the LAN 52 via a router 53. Furthermore, the network 50 may be any of a dedicated line, a telephone line, an in-enterprise network, a mobile communication network, other communication lines, and combinations thereof, and may be wired or wireless. The client terminal 40 is also configured to be connected to the Internet 51. Alternatively, the server units 21 of the server 20 may be connected to each other by the Internet 51 instead of or in addition to the LAN 52.

The server 20 guides the user to various procedures necessary for the user to quote the price of an article via the client terminal 40. That is, the server 20 functions as a web server that causes various web pages to be displayed on a display unit of the client terminal 40 according to an access from the client terminal 40. Furthermore, the server 20 may execute a process such as arrangement of the ordered articles, a delivery instruction, and billing of the purchase price in response to the order placed by the user.

Figure 2:
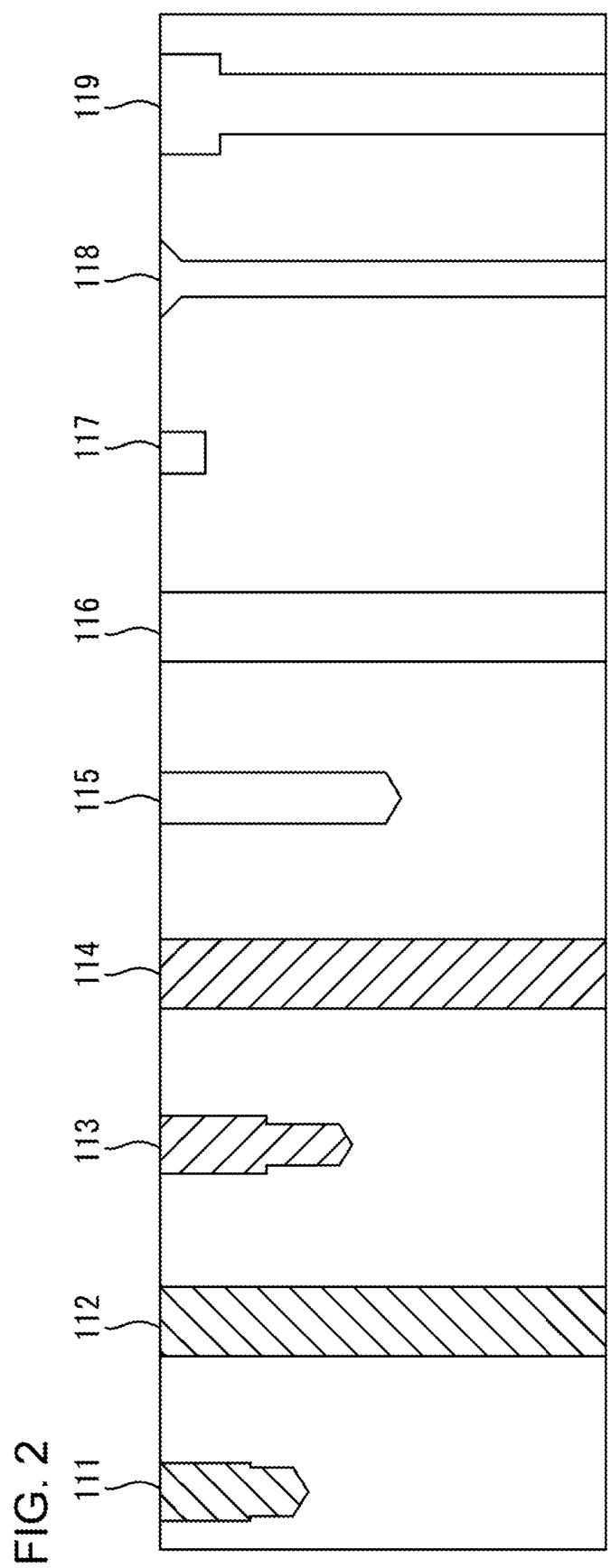
FIG. 2 is an explanatory view of an example of a hole element.

An outline of the present invention will be described with reference to FIG. 2. FIG. 2 is a schematic cross-sectional view illustrating an example of the hole element, and illustrates a schematic cross section of an article represented by the shape data D1. In FIG. 2, a precision hole 111, a precision hole 112, a tap hole 113, a tap hole 114, a drill hole 115, a drill hole 116, a drill hole 117, a counterbore hole 118, and a counterbore hole 119 are arranged in this order from the left. The precision hole 111, the tap hole 113, the drill hole 115, and the drill hole 117 are blind holes that do not penetrate the article. The precision hole 112, the tap hole 114, the drill hole 116, the counterbore hole 118, and the counterbore hole 119 are through holes that penetrate the article. Further, the counterbore hole 118 is also a countersunk hole, and the counterbore hole 119 is also a stepped hole and a bolt hole. In this way, one hole element may have a plurality of hole attributes.

In the shape data D1, surface information can be assigned to an element, and the assigned surface information is included in the shape data D1. For example, the user can assign the surface information to the surface of the hole element in CAD software of the client terminal 40. Furthermore, the surface information can also be assigned to the surface (or an appearance plane) of the article. As an example, the surface information may indicate a color or a texture set on the surface of the element or indicate that there is no color or texture set on the surface. As an example, the texture is indicated by surface information indicating an image, hatching, or a pattern representing the material of the surface. In addition, the color is indicated by surface information indicating a value in a known color system or color space such as an RGB color system, an XYZ color system, an L*u*v* color system, an L*a*b* color system, a Munsell color system, or an Ostwald color system. In the following description, an example in which a color indicated by a value in the RGB color system is applied to the surface of the hole element will be described.

In FIG. 2, a color applied to the hole element surface is indicated by hatching. For example, hatching of rightward rising diagonal lines of the precision hole 111 and the precision hole 112 indicates red (as an example, R value 223, G value 34, and B value 34). Further, hatching of leftward rising diagonal lines of the tap hole 113 and the tap hole 114 indicates green (as an example, R value 32, G value 223, and B value 56). In addition, the drill hole 115, the drill hole 116, the drill hole 117, the counterbore hole 118, and the counterbore hole 119 are not hatched, and this indicates that there is no color applied to the surface.

In the quotation system 100, the hole type is set to the hole element based on the surface information assigned to the hole element in the shape data D1. For example, when the surface information of the hole element indicates red, a tap hole is set as the hole type to the hole element. As a result, the hole type can be automatically set based on the shape data D1 received from the client terminal 40 of the user. Further, since the user does not need to set the hole type, it is possible to shorten the time required for quotation by omitting a hole type setting step.

In addition, the hole type set in the shape data D1 may be deleted or changed at time of upload or at time of conversion of a data format. Even in this case, the hole type of the hole element can be automatically set based on the surface information. In addition, since the hole type can be set without performing geometry processing, there is no limitation on the CAD software used by the user. Therefore, it is possible to impart versatility to the automatic setting of the hole type.

[Control System]

Figure 3:
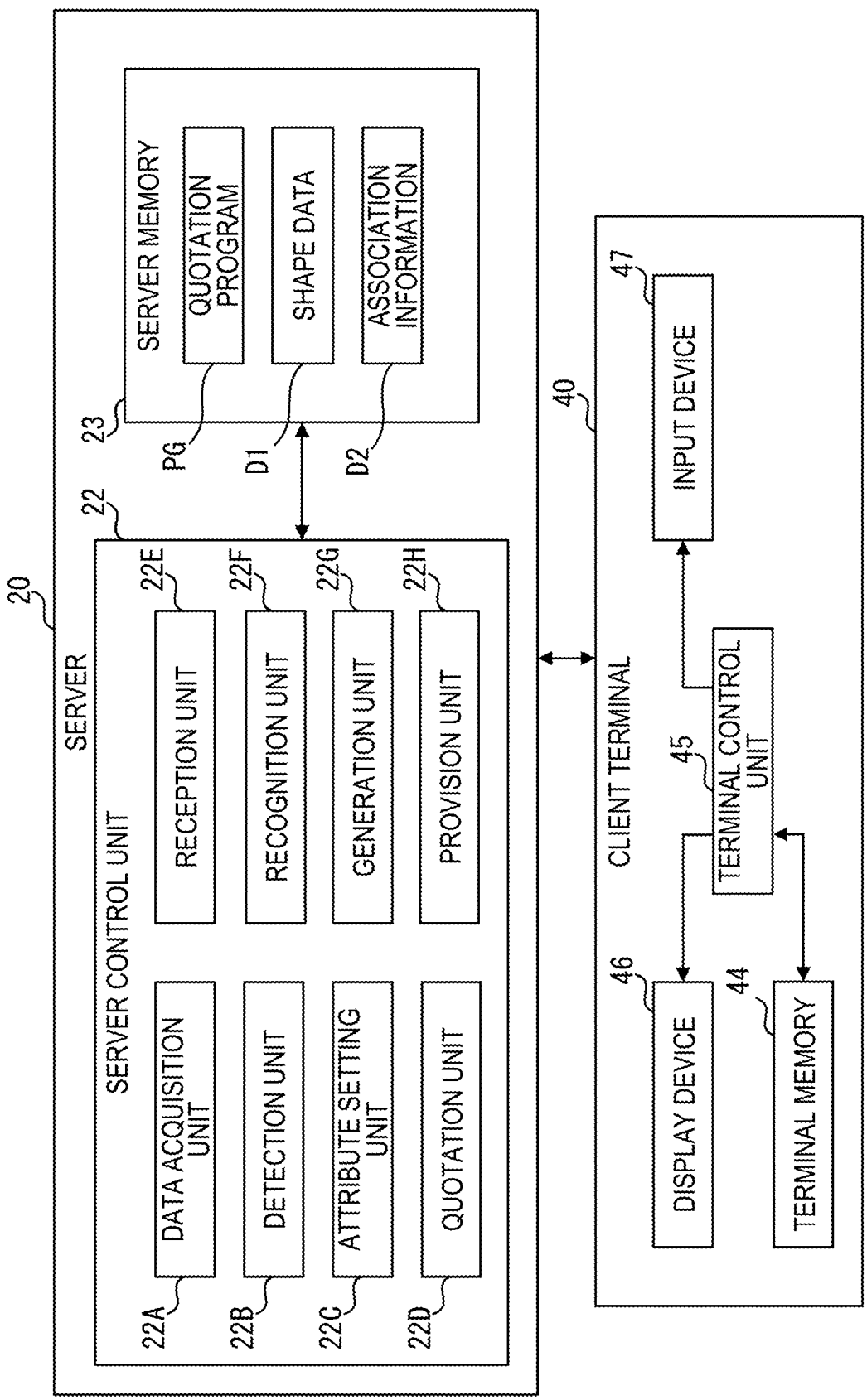
FIG. 3 is a schematic block diagram of the quotation system.

Next, a schematic configuration of a control system of the quotation system 100 will be described with reference to FIG. 3. The server 20 includes a server control unit 22 as a control section and a server memory 23 as a non-transitory computer-readable storage medium. The server control unit 22 is configured as a computer in which a processor that executes various arithmetic processes and operation control according to a predetermined program, an internal memory necessary for the operation of the processor, and other peripheral devices are combined. The processor is, for example, a central processing unit (CPU) or a micro-processing unit (MPU), and controls the entire device based on a control program stored in the server memory 23 and also controls various processes in an integrated manner. Furthermore, the server control unit 22 executes various processes associated with the quotation of the price of an article based on a quotation program PG stored in the server memory 23.

The server memory 23 includes random access memory (RAM) that is a system work memory for the processor to operate, and a storage device such as a read only memory (ROM), a hard disc drive (HDD), and a solid state drive (SSD) that store a program and system software. However, the server memory 23 is not limited to the example of being provided as a part of the server 20, and may be provided as a database server that cooperates with the server 20. In the following description, the CPU executes processing operations such as various calculations, controls, and determinations according to the control program stored in the ROM or the HDD.

In addition, the server memory 23 stores the shape data D1 of an article, association information D2 created for each user, and setting information D3. Then, in the association information D2, the surface information that can be assigned to the shape data D1 is associated with the hole attribute indicating the attribute of the hole element for each user. As an example, the association information D2 is a table or a list in which the surface information (for example, information indicating the color) is associated with the hole attribute (for example, the hole type). The table or list can be created by the user on a setting screen and is associated with user identification information (for example, a user ID) for identifying the user. Incidentally, the user identification information may be common to a plurality of persons in charge or may be different for each person in charge.

Figure 4:
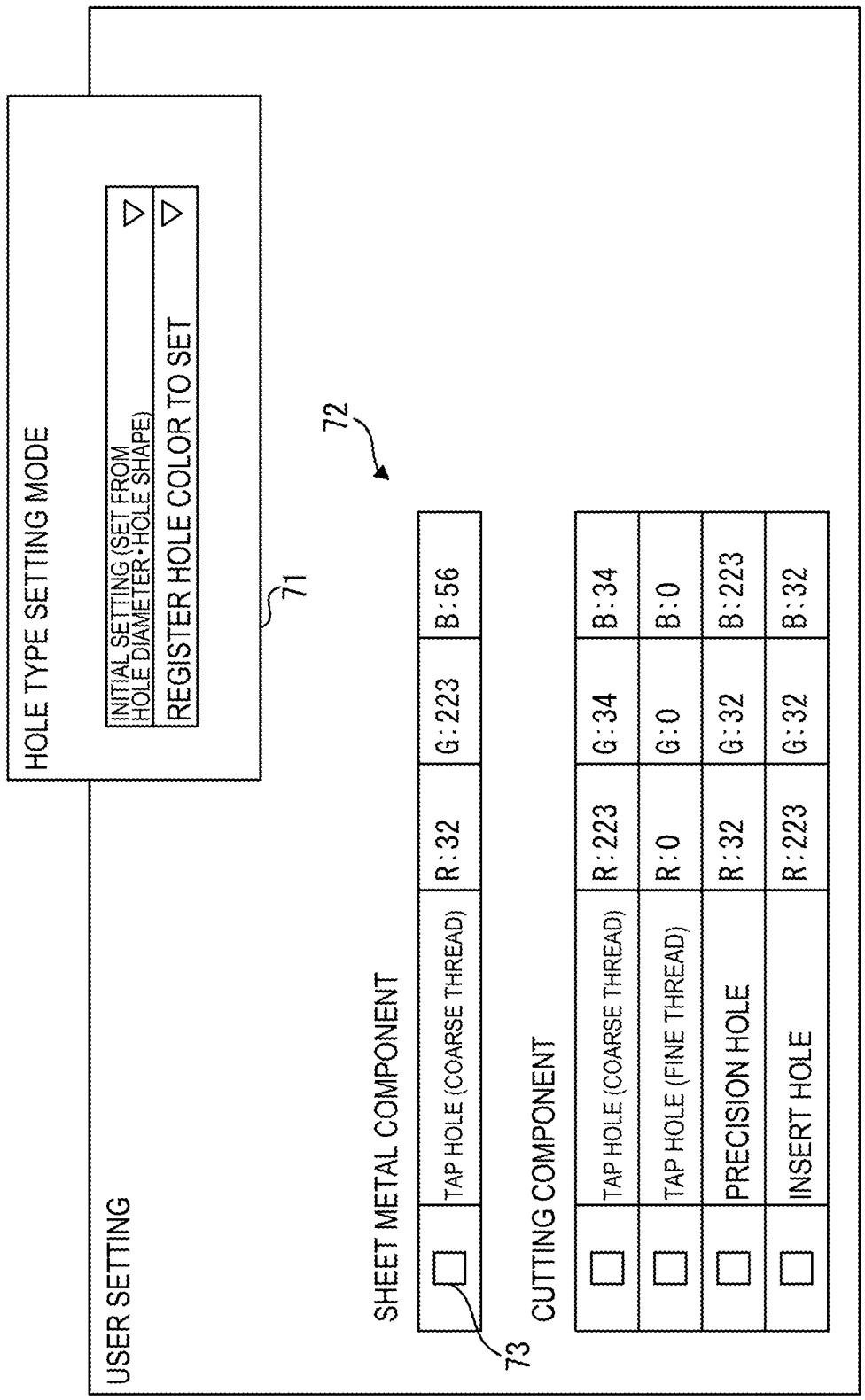
FIG. 4 is a schematic diagram illustrating an example of a setting screen.

For example, FIG. 4 is a schematic diagram illustrating an example of the setting screen. In a mode setting field 71 of the setting screen, the user can select a shape recognition mode as an initial setting and a hole attribute setting mode for setting the hole attribute according to the surface information. When the user selects the hole attribute setting mode, the user designates surface information to be associated with the hole attribute to be set. As a result, the server memory 23 stores the surface information associated with the hole attribute as the association information D2. Alternatively, the hole attribute setting mode may be used as the initial setting.

In a surface information field 72 of FIG. 4, as association information D2 of a sheet metal component which is an example of the article, green (R value 32, G value 223, B value 56) is associated with the hole attribute of a tap hole for a coarse thread. In the surface information field 72, red (R value 223, G value 34, B value 34) is associated with the hole attribute of a tap hole for a coarse thread, as the association information D2 of a cutting component which is an example of the article. Similarly, RGB values as the surface information are associated with a tap hole for a fine thread, a precision hole, and an insert hole. Incidentally, the hole attribute for which the user does not designate the surface information may be associated with the surface information indicating that there is no color set on the surface.

Further, the user may individually select the hole attribute to which the hole attribute setting mode is applied, by selecting a check box 73 in the surface information field 72. In this case, the hole attribute for which the check box 73 is not selected is set to the hole element by shape recognition described later. Incidentally, in the association information D2, the surface information may be associated with at least one hole attribute. Even in this case, the one hole attribute can be automatically set.

Alternatively, the association information D2 may be automatically created by the server 20. As an example, the server 20 duplicates the association information D2 applied to the shape data D1 uploaded by the user in the past, and creates the association information D2 to be applied to the shape data D1 newly uploaded by the user. Further, the association information D2 may be created in advance by the administrator of the server 20. In the cases, the user may be able to change the association information D2 automatically created or created by the administrator. For example, the user may be able to change the surface information to be associated with the hole attribute from the setting screen.

In the setting information D3, the color or texture set on the surface of the hole element of an article image (FIG. 6) is associated with the hole attribute. As an example, the setting information D3 is a table or list in which the color or texture is associated with the hole attribute (for example, the hole type). The table or list is created in advance. As a specific example, in the setting information D3, a straight hole is associated with yellow (as an example, R value 255, G value 255, and B value 0), a tap hole is associated with purple (for example, R value 128, G value 0, and B value 128), an insert hole is associated with reddish purple (as an example, R value 218, G value 80, and B value 143), a countersunk hole is associated with green (as an example, R value 32, G value 223, and B value 56), a slot is associated with yellowish green (as an example, R value 0, G value 255, and B value 0), and other holes is associated with gray (as an example, R value 223, G value 34, and B value 34). Further, in the setting information D3, an orange color (as an example, R value 230, G value 121, and B value 40) may be associated with a hole whose hole attribute cannot be identified.

Returning to FIG. 3, the server control unit 22 is connected to an operation unit (not illustrated) including a keyboard or various switches for inputting predetermined commands and data, in a wired or wireless manner. In addition, the server control unit 22 is connected to a display unit (not illustrated) that displays an input state, a setting state, a measurement result, and various types of information of the server device, in a wired or wireless manner. Incidentally, the server control unit 22 can also perform control according to a program stored in a portable recording medium such as a compact disc (CD), a digital versatile disc (DVD), a compact flash (CF) card, or a universal serial bus (USB) memory, or an external storage medium such as a cloud server on the Internet.

The quotation program PG stored in the server memory 23 causes the server control unit 22 as a computer to function as a data acquisition unit 22A which is a data acquisition section, a detection unit 22B which is a detection section, an attribute setting unit 22C which is an attribute setting section, a quotation unit 22D which is a quotation section, a reception unit 22E which is a reception section, a recognition unit 22F which is a shape recognition section, a generation unit 22G which is an image generation section, and a provision unit 22H which is a provision section. That is, the server control unit 22 includes the data acquisition unit 22A, the detection unit 22B, the attribute setting unit 22C, the quotation unit 22D, the reception unit 22E, the recognition unit 22F, the generation unit 22G, and the provision unit 22H, as logical devices realized by a combination of computer hardware and software.

Incidentally, the server control unit 22 includes, in addition to the logical devices described above, for example, a logical device (not illustrated) that controls switching of display of a web page according to an operation of the client terminal 40. Furthermore, the server memory 23 records various types of data (not illustrated) such as user information, a past quotation result, image data used to display a web page, and data including information such as a model number, a name, or a feature of a product or an article.

[Data Acquisition Section]

The data acquisition unit 22A acquires the shape data D1 of the article including the hole element. As an example, the user uploads the shape data D1 to the server 20. Then, the server control unit 22 stores the shape data D1 received from the client terminal 40 of the user in the server memory 23. Subsequently, the data acquisition unit 22A acquires the shape data D1 from the server memory 23. In the shape data D1 uploaded by the user, the surface information is assigned to the hole element. Alternatively, the user may assign the surface information to the hole element of the uploaded shape data D1, for example, via a web page provided by the server 20.

[Detection Section]

The detection unit 22B detects the surface information of the hole element in the information assigned to the shape data D1. That is, the surface information of the hole element is a part of the shape data D1, and the detection unit 22B detects the surface information. As an example, when the user uploads the shape data D1 and the data acquisition unit 22A acquires the shape data D1, the detection unit 22B detects the surface information assigned to the hole element recognized by the recognition unit 22F. Alternatively, the detection unit 22B may detect the surface information of the hole element when the user selects the hole attribute setting mode. Incidentally, other information assigned to the shape data D1 includes information of the size and the tolerance of each element.

[Attribute Setting Section]

The attribute setting unit 22C refers to the association information D2 in which the surface information that can be given to the shape data D1 and the hole attribute indicating the attribute of the hole element are associated for each user. Then, the attribute setting unit 22C sets the hole attribute corresponding to the surface information of the hole element detected by the detection unit 22B to the hole element. For example, the attribute setting unit 22C refers to the association information D2 as illustrated in FIG. 4. In this case, when the surface information indicating red is assigned to the hole element in the shape data D1 of a cutting component, the attribute setting unit 22C sets the hole attribute of a tap hole for a coarse thread in the hole element.

In addition, when the hole attribute setting mode for setting the hole attribute is designated by the surface information, the attribute setting unit 22C sets the hole attribute corresponding to the detected surface information, to the hole element. Then, when the hole attribute setting mode is not designated, the attribute setting unit 22C sets, to the hole element, the hole attribute based on the result of the shape recognition process by the recognition unit 22F to be described later. As an example, the user selects either the shape recognition mode or the hole attribute setting mode in the mode setting field 71 of the setting screen (FIG. 4). Then, when the user selects the hole attribute setting mode, the user inputs the surface information associated with the hole attribute to be set. Alternatively, the screen for inputting the surface information to be associated with the hole attribute and the setting screen of the hole attribute setting mode may be separately provided.

Incidentally, even when the hole attribute setting mode is designated, the attribute setting unit 22C sets the hole attribute based on the result of the shape recognition process, for the hole element to which the surface information is not assigned. However, when the hole attribute setting mode is designated, the attribute setting unit 22C may not set the hole attribute for the hole element to which the surface information is not assigned. Furthermore, when the surface information different from the surface information assigned to the surface (or the appearance plane) of the element of the article is assigned to the hole element, the attribute setting unit 22C may set the hole attribute corresponding to the detected surface information, to the hole element. In this case, when the different surface information is not assigned to the hole element, the attribute setting unit 22C sets the hole attribute based on the result of the shape recognition process by the recognition unit 22F, to the hole element. As a result, even if the user does not designate the mode, the attribute setting unit 22C can set the hole attribute corresponding to the surface information.

[Quotation Section]

The quotation unit 22D creates quotation information of the article based on the hole attribute set by the attribute setting unit 22C and the shape data D1. As a result, the quotation information of the article can be created based on the hole attribute corresponding to the surface information. The creation of the quotation information will be described with reference to FIG. 5. Incidentally, FIG. 5 illustrates an example of a quotation screen displayed on a display device 46 of the client terminal 40, and the quotation unit 22D creates the quotation screen. The quotation screen is displayed on the display device 46 of the client terminal 40, whereby the provision unit 22H provides the user of the client terminal 40 with the quotation information of the article. As an example, the quotation information is at least one of the price of the article and the number of days required for shipping the article. Alternatively, the quotation information may be the price of the machining, the date on which the article is shipped, or the date on which the article is delivered to the user.

The quotation screen includes a basic information tab 11 and a tree view tab 12. In a basic information view displayed by selecting the basic information tab 11, for example, information necessary for manufacturing, such as a material and a method of surface processing, and the purchase quantity are displayed. In the example of FIG. 5, a tree view 13 displayed by selecting the tree view tab 12 is illustrated. In the tree view 13, for example, the external dimension of the article, the hole type, and the hole diameter are displayed.

In the example of FIG. 5, a dimension "100 mm" in the X-direction, a dimension "60 mm" in the Y-direction, and a dimension "20 mm" in the Z-direction are displayed as the information indicating the external dimension of the article A. Further, "4×M10" is displayed as information indicating that tap holes for a coarse thread corresponding to "M10" defined based on the JIS standard are machined in four places on the upper plane (Top) of the article A. In addition, "4,980 yen" is displayed as the price of one article. Further, "6 days" is displayed as the number of actual work days required until shipment. The quotation unit 22D creates the quotation information when it is a tap hole for a coarse thread which is the hole type set by the attribute setting unit 22C, based on the shape data D1. That is, the quotation unit 22D adds the cost required for machining the tap hole for the coarse thread to the price of the article A.

In addition, a quotation confirm button 14 is displayed at the lower part of the quotation screen. When the user selects the confirm button 14, the total monetary amount, the ship date, and the number of days of actual work days required until shipment are displayed below the confirm button 14. At this time, the amount of money obtained by multiplying the price of the article by the purchase quantity is displayed on the quotation screen as the total monetary amount. Further, the model number corresponding to the displayed article is displayed in a model number section 15. Further, a print button 16 is displayed below the confirm button 14. When the user selects the print button 16, a quotation result can be printed. Further, an output button 17 and an order button 18 are displayed side by side with the print button 16.

When the user selects the output button 17, electronic data of an order list can be output. In addition, when the user selects the order button 18, an order screen (not illustrated) for placing an order is displayed on the display device 46 of the client terminal 40. The user can place an order for an article specified by the model number on the order screen. When the user places an order for an article, the quotation unit 22D transmits an article image generated by the generation unit 22G, the specified model number, and the purchase quantity to the manufacturer of the article. Furthermore, the quotation unit 22D may execute a process of transmitting a delivery instruction of the article to the manufacturer and a process of billing the purchase price to the user. Alternatively, when the user selects the order button 18 on the quotation screen, the quotation unit 22D may transmit the specified model number and purchase quantity to the manufacturer of the article without displaying a further operation screen.

Further, the quotation unit 22D executes an order placement process for an article corresponding to the shape data D1. In the order placement process, for example, the quotation unit 22D specifies a model number of an article and creates the order screen as a web page for placing an order for the article corresponding to the specified model number. Then, the provision unit 22H causes the order screen to be displayed on the display device 46 of the client terminal 40. Then, when the user places an order for an article, the quotation unit 22D transmits the article image generated by the generation unit 22G, the identified model number, and the purchase quantity to the manufacturer of the article. Incidentally, the quotation screen illustrated in FIG. 5 is a web page at a previous stage of the order screen.

[Reception Section]

The reception unit 22E receives designation of the surface information of the hole element corresponding to each of a plurality of hole attributes from the client terminal 40, and creates the association information D2 associated with the user identification information for identifying each user. As a result, the user can cause the attribute setting unit 22C to set the hole attribute by using the surface information that is easily used by the user. Therefore, it is possible to improve the convenience of the user. As an example, the reception unit 22E displays the setting screen (FIG. 4) on the display device 46 of the client terminal 40. Then, the user designates the surface information of the hole element to be corresponded to each of the plurality of hole attributes on the setting screen. Then, the reception unit 22E receives designation by the user, creates the association information D2, and stores the association information D2 in the server memory 23.

[Shape Recognition Section]

The recognition unit 22F executes the shape recognition process of the article based on the shape data D1. As an example, in the shape recognition process, the recognition unit 22F recognizes the shape of each element including the hole element based on the shape data D1. Then, the recognition unit 22F recognizes the hole attribute corresponding to the shape of the recognized hole element, as a result of the shape recognition process. Subsequently, the attribute setting unit 22C automatically sets the hole attribute to the hole element. As a result, the hole attribute corresponding to the recognized shape of the hole element is included in the shape data D1. Alternatively, the recognition unit 22F may store the hole attribute as the result of the shape recognition process in the server memory 23. In this case, the attribute setting unit 22C acquires the result of the shape recognition process from the server memory 23.

For example, the recognition unit 22F recognizes the hole types of the drill hole 115, the drill hole 116, the drill hole 117, the counterbore hole 118, and the counterbore hole 119 having no color set on the surface in FIG. 2, by the shape recognition process. As an example, the recognition unit 22F recognizes a non-through hole having a cylindrical shape and a flat hole bottom, a non-through hole having a cylindrical shape and a conical hole bottom, a through hole having a cylindrical shape, a hole having a cylindrical shape and a chamfered inlet, and a hole having a shape having a plurality of steps as hole elements. Then, when a high-precision tolerance (for example, the tolerance zone class "H7") is set for the hole element, the recognition unit 22F recognizes that the hole element is a precision hole.

Furthermore, when the hole diameter of the hole element is equal to the hole diameter (or pilot hole diameter) set in advance in the server 20, the recognition unit 22F recognizes that the hole element is a tap hole. Furthermore, when the article is made of a predetermined material (for example, aluminum or resin) and the hole diameter of the hole element is equal to the hole diameter set in advance in the server 20, the recognition unit 22F recognizes that the hole element is an insert hole. In addition, when the inlet has a cylindrical shape and a chamfered inlet, that is, when the inlet of the hole element has a truncated cone shape, the recognition unit 22F recognizes the hole element as a countersunk hole.

Furthermore, when the hole element has a plurality of steps, the recognition unit 22F recognizes the hole element as a stepped hole. Then, when the hole element does not correspond to a precision hole, a tap hole, an insert hole, a countersunk hole, or a stepped hole, the recognition unit 22F recognizes that the hole element is a drill hole. Incidentally, the recognition unit 22F may not recognize the hole attribute for a hole attribute (for example, an oblique hole) that cannot be recognized by the shape. In this case, the user may be able to set the hole attribute on a web page (for example, an instruction screen to be described later) provided by the server control unit 22.

Incidentally, the provision unit 22H may provide the user with the result of the shape recognition process. For example, the provision unit 22H causes the hole attribute as a result of the shape recognition process to be displayed on the display device 46 of the client terminal 40. As a result, the provision unit 22H provides the user with the result of the shape recognition process. The user confirms the result of the shape recognition process. The user changes the hole attribute of the hole element of the shape data D1 when the change is necessary. Alternatively, the provision unit 22H may provide the user with the result of the shape recognition process by transmitting the result of the shape recognition process to the client terminal 40.

[Image Generation Section]

Figure 6:
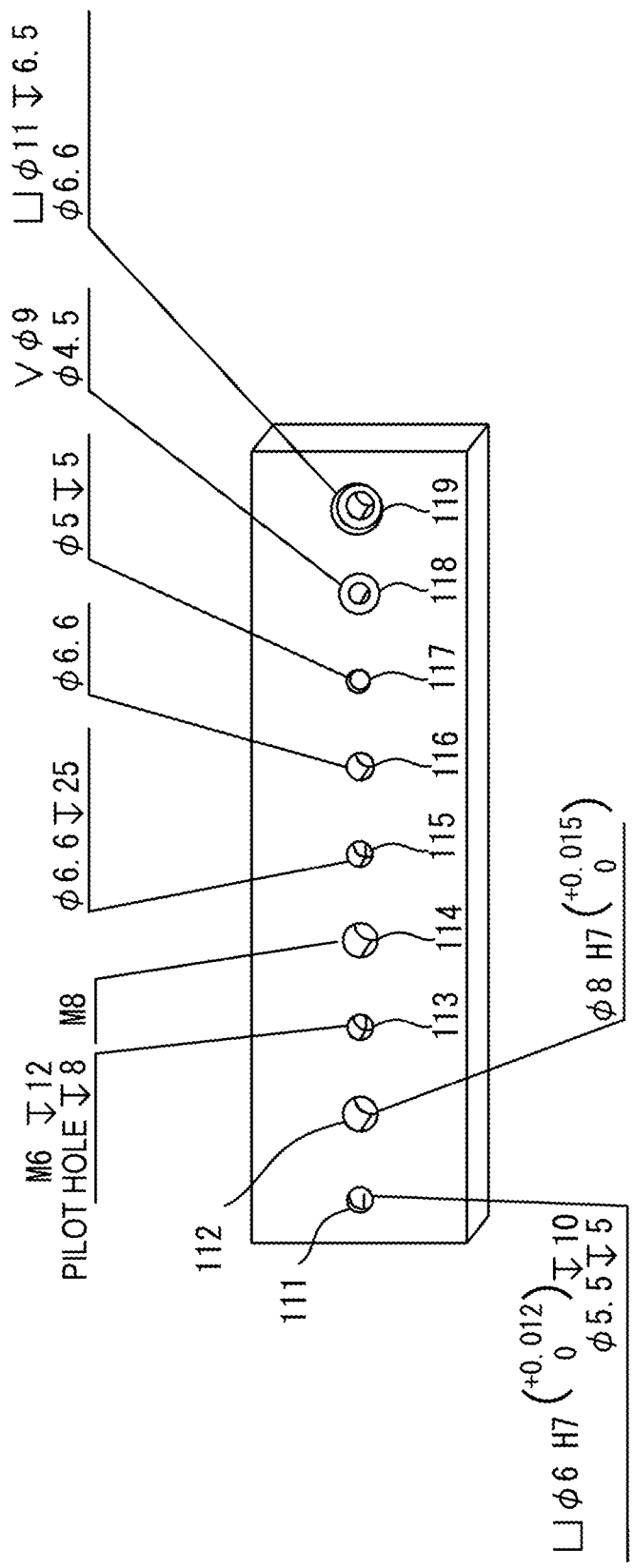
FIG. 6 is a schematic diagram illustrating an example of an article image.

The generation unit 22G generates an article image in which the set hole attribute is expressed on the hole element of a three-dimensional model of the article, based on the hole attribute set by the attribute setting unit 22C and the shape data D1. FIG. 6 is an example of the article image generated by the generation unit 22G. In the article image, the precision hole 111, the precision hole 112, the tap hole 113, the tap hole 114, the drill hole 115, the drill hole 116, the drill hole 117, the counterbore hole 118, and the counterbore hole 119 are arranged in this order from the left.

Then, in the article image, reference signs indicating that the tolerance zone class "H7" is set are attached to the precision hole 111 and the precision hole 112. Further, the tap hole 113 and the tap hole 114 are denoted by reference signs indicating that nominal sizes "M6" and "M8" are set. Furthermore, the drill hole 115 and the drill hole 117 are denoted by reference signs indicating blind holes. In addition, the counterbore hole 118 and the counterbore hole 119 are denoted by a substantially U-shaped symbol indicating a counterbore hole or a substantially V-shaped symbol indicating a countersunk hole on the left side of the hole diameter. As a result, the generation unit 22G expresses the hole attribute on the hole element.

In addition, the generation unit 22G may generate the article image by changing the hole element of the shape data D1 uploaded by the user to a shape according to the hole attribute. As a result, the generation unit 22G can also express the hole attribute on the hole element. For example, in the shape data D1 uploaded by the user, the hole element may be a hole having a simple bottom or a penetrating hole having a simple cylindrical shape to which the surface information is assigned. In this case, the generation unit 22G generates the article image by changing the shape of the hole to a shape corresponding to the hole attribute. As an example, when the hole type is a blind hole and a tap hole, the generation unit 22G changes a hole having a simple cylindrical shape to a hole having a conical hole bottom. As a result, the shape of the hole bottom of a pilot hole to be formed by a drill tip is reflected in the article image, and the shape according to the hole attribute can be reflected to the hole element.

Incidentally, the generation unit 22G may generate a two-dimensional article image in which the set hole attribute is expressed on the hole element. As an example, the generation unit 22G may create a six-sided view of the article or a cross-sectional view of the article so as to include the hole element having a shape corresponding to the hole attribute or the hole element with the reference sign or the symbol corresponding to the hole attribute.

In addition, the generation unit 22G generates the article image such that the color or texture corresponding to the hole attribute is expressed on the hole element, with reference to the setting information D3. That is, when generating the article image, the generation unit 22G does not refer to the color or texture set to the hole element of the shape data D1 uploaded by the user. As an example, when purple is associated with a tap hole in the setting information D3, even if green is set to a tap hole of the shape data D1, the generation unit 22G sets purple to the tap hole of the article image. As a result, the surface of the tap hole is displayed in purple in the article image. As a result, the generation unit 22G expresses the color or texture corresponding to the hole attribute on the hole element.

In addition, different colors may be associated with the same attribute between the setting information D3 and the association information D2. Since the generation unit 22G does not refer to the association information D2, even if there is a difference between both pieces of information, there is no problem in generating the article image. That is, a color or texture different from the color or texture set by each user in three-dimensional CAD data may be set to the hole attribute of the article image. The setting information D3 is information different from the association information D2 created by each user, and is commonly used by all users. As a result, it is possible to prevent an occurrence of a situation in which the color or texture of the hole attribute of the article image provided to a supplier differs for each user. Therefore, the manufacturer can specify the hole attribute based on a specific color or texture included in the article image.

[Provision Section]

The provision unit 22H provides the user with the quotation information and the article image. As an example, the provision unit 22H causes the article image (FIG. 6) to be displayed on the display device 46 of the client terminal 40 so as to be disposed side by side with the quotation screen (FIG. 5). As a result, the provision unit 22H provides the user with the quotation information and the article image. Therefore, the user can determine the validity of the quotation while confirming the article image. Alternatively, the provision unit 22H may provide the user with the quotation information and the article image by transmitting them to the client terminal 40.

[Client Terminal]

The client terminal 40 includes a terminal control unit 45 that controls the client terminal 40 and a terminal memory 44 that stores a control program. The terminal control unit 45 is a computer in which a processor that executes various arithmetic processes and operation control according to a predetermined program and other peripheral devices are combined. The client terminal 40 further includes the display device 46 and an input device 47.

As an example, the processor of the terminal control unit 45 is, for example, a CPU or an MPU, and controls the entire device based on the control program stored in the terminal memory 44 and also controls various processes in an integrated manner. The terminal memory 44 further includes a RAM that is a system work memory for the processor to operate, and a storage device such as a ROM, an HDD, and an SSD that store a program and system software. In the following description, an example in which the CPU executes processing operations such as various calculations, controls, and determinations according to the control program stored in the ROM or the HDD will be described. Incidentally, the terminal control unit 45 can also perform control according to a program stored in a portable recording medium such as a CD, a DVD, a CF card, and a USB memory, or an external storage medium such as a cloud server on the Internet.

The terminal memory 44 is an external storage device including a non-volatile storage medium (non-transitory computer-readable storage medium) such as a hard disk and a semiconductor storage device. Furthermore, in addition to the control program, the terminal memory 44 stores a design program for creating the shape data D1 such as CAD software, and various programs such as a web browser.

The input device 47 is a keyboard, a numeric keypad, or a touch panel, for example. The user creates or changes the shape data D1 by using the input device 47. Then, the shape data D1 created by using the input device 47 is recorded in the terminal memory 44. In addition, when the quotation information and the article image are received from the server 20, the display device 46 displays the quotation information and the article image. Further, the display device 46 displays web pages such as the setting screen, the quotation screen, and the order screen. The user places an order for the article according to the web page displayed on the display device 46.

[Quotation Processing]

Figure 7:
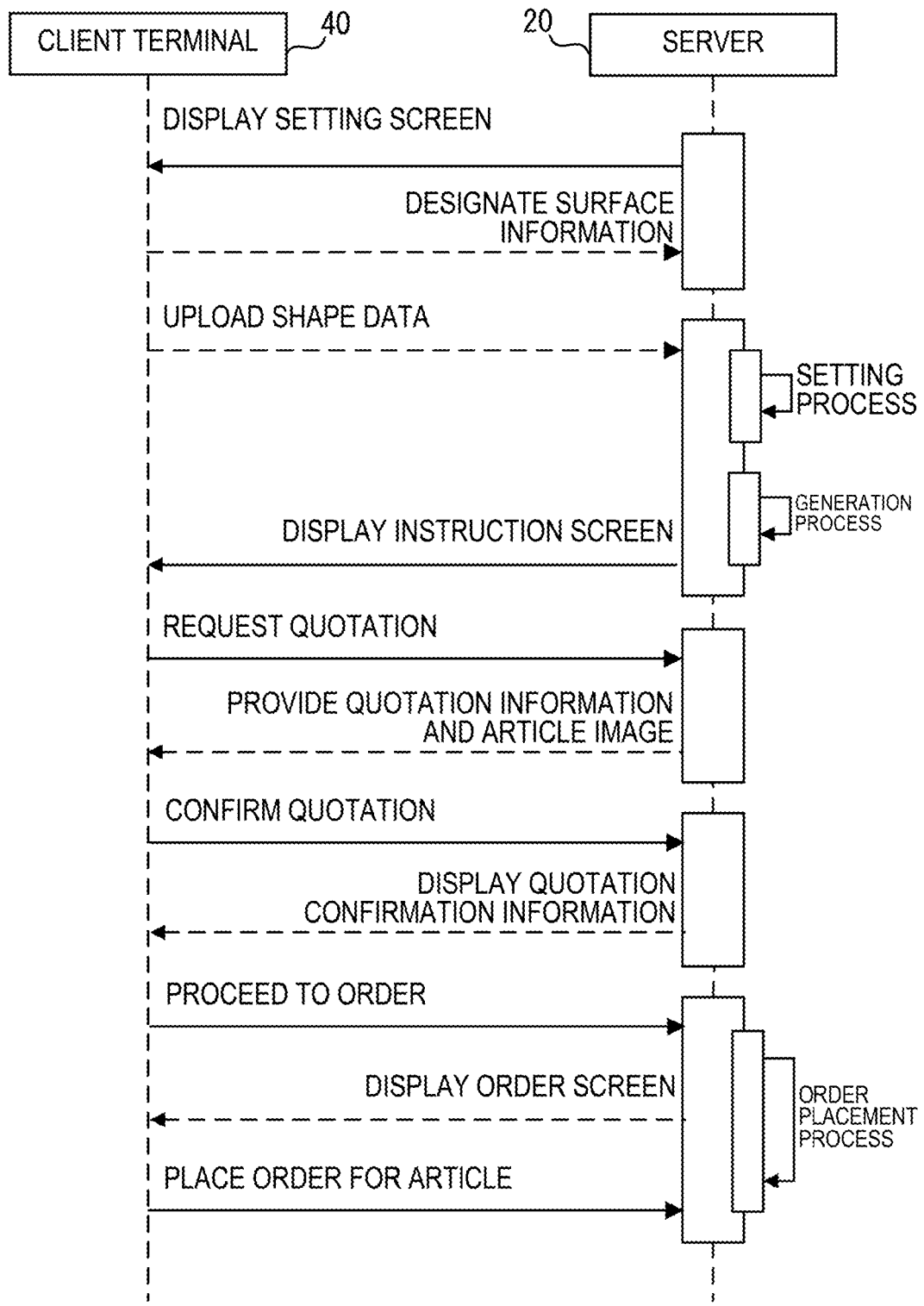
FIG. 7 is a sequence diagram of quotation processing.

Next, quotation processing will be described with reference to FIGS. 7 to 11. As illustrated in FIG. 7, in response to a request from the user, the reception unit 22E displays the setting screen (FIG. 4) on the display device 46 of the client terminal 40. As an example, the user selects a mode setting icon on a user setting screen. As a result, the client terminal 40 transmits a setting screen display request to the server 20. Alternatively, the reception unit 22E may cause the setting screen to be displayed when the user has logged in to the quotation system 100. Then, the user designates the surface information of the hole element to be corresponded to each of the plurality of hole attributes on the setting screen. As a result, the association information D2 created in advance by the user is stored in the server 20. Furthermore, a designation screen on which hole information can be designated can be displayed on the setting screen. For example, initial designation for a precision hole includes the hole type (which indicates that the hole is a blind hole or a through hole, or is a straight hole or an insert hole), an effective depth, and a tolerance zone.

When the user desires to quote an article, the user uploads the shape data D1 to the server 20. Then, the server control unit 22 of the server 20 stores the shape data D1 in the server memory 23, and the data acquisition unit 22A acquires the shape data D1. When the data acquisition unit 22A acquires the shape data D1, a setting process of the hole attribute is executed. Specifically, in the setting process, the attribute setting unit 22C determines whether or not the hole attribute setting mode is designated. Then, when the hole attribute setting mode is designated, the detection unit 22B detects the surface information of the hole element. When the surface information of the hole element is detected, the attribute setting unit 22C refers to the association information D2. Then, the attribute setting unit 22C sets the hole attribute corresponding to the surface information of the hole element detected by the detection unit 22B to the hole element. As a result, the hole attribute is automatically set to the hole element.

On the other hand, when the hole attribute setting mode is not designated in the setting process, the recognition unit 22F recognizes the shape of the hole element based on the shape data D1. Then, the recognition unit 22F recognizes the hole attribute corresponding to the shape of the recognized hole element, as a result of the shape recognition process. Subsequently, the attribute setting unit 22C sets the hole attribute to the hole element. As a result, the hole attribute is automatically set to the hole element. Incidentally, even when the hole attribute setting mode is designated, the hole attribute based on the result of the shape recognition process is similarly set for the hole element to which the surface information is not assigned.

When the hole attribute is set, the generation unit 22G executes a generation process of generating an article image. In the generation process, the generation unit 22G generates the article image based on the hole attribute set by the attribute setting unit 22C and the shape data D1. At this time, the generation unit 22G refers to the setting information D3. Then, the generation unit 22G generates the article image such that the color or texture corresponding to the hole attribute set in the shape data D1 is expressed on the hole element. Then, the generation unit 22G stores the generated article image in the server memory 23. In addition, the generation unit 22G further generates and stores a cross-sectional image of the hole element. In addition, when the hole attribute is set, the provision unit 22H displays an instruction screen which is a web page for instructing the hole information. The user can input and set the hole information on the instruction screen displayed on the display device 46 of the client terminal 40. FIGS. 8 to 11 illustrates an example of the instruction screen.

Figure 8:
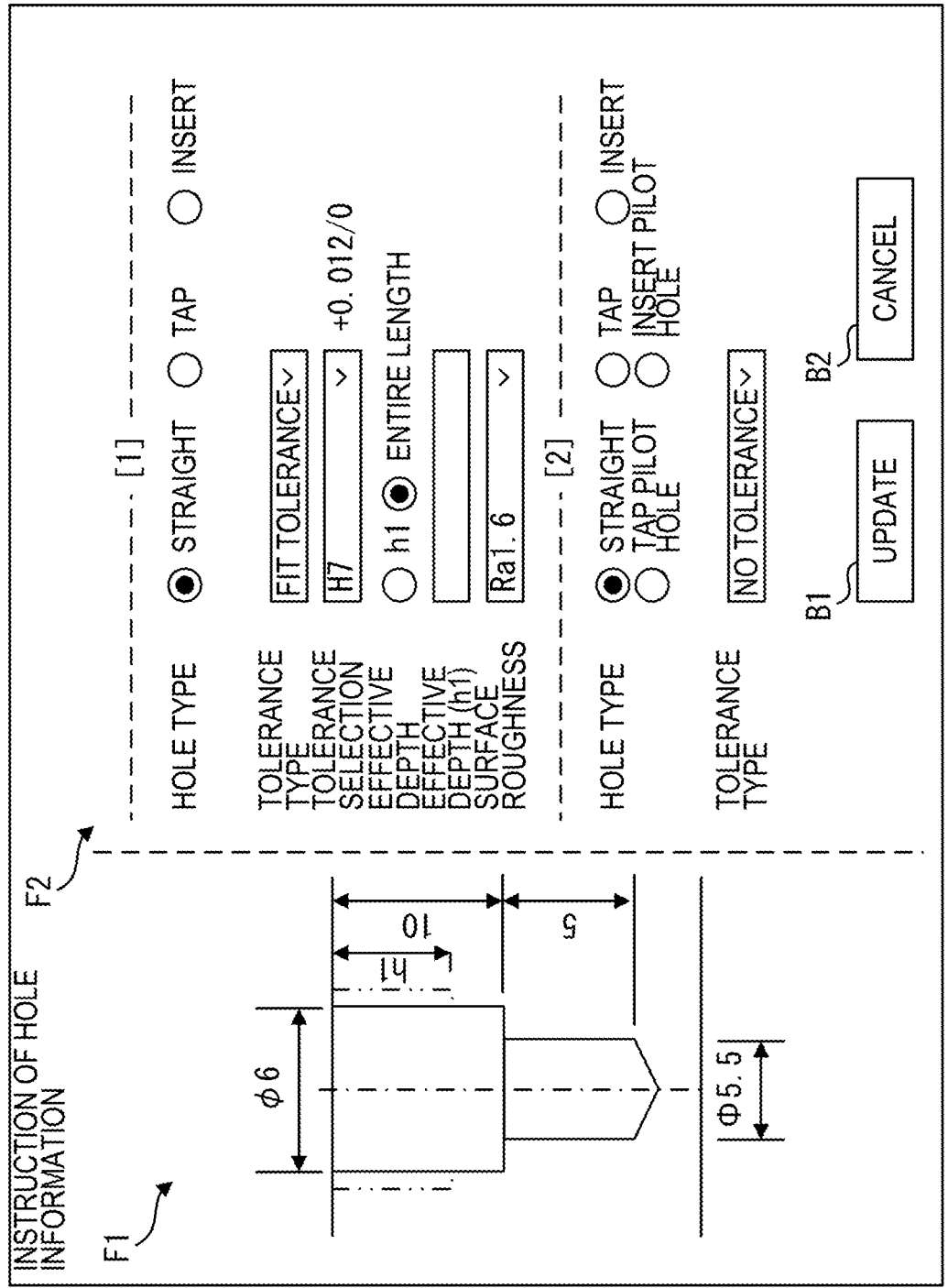
FIG. 8 is a schematic diagram illustrating an example of an instruction screen of a precision hole.

FIG. 8 illustrates an instruction screen for a precision hole. The instruction screen includes an image field F1 in which the cross-sectional image of the hole element generated by the generation unit 22G is displayed. In addition, the instruction screen includes an instruction field F2 of hole information. As an example, when the hole type of the precision hole is set, the hole type in the initial designation designated by the user (straight hole in the example of FIG. 8) is automatically set. In addition, the tolerance in the initial designation (the tolerance type "fit tolerance" and the tolerance zone class "H7" in the example of FIG. 8) and the effective depth in the initial designation ("entire length" corresponding to the depth of the first stage in the example of FIG. 8) are automatically set. As an example, when the hole is a blind hole, if the effective depth is the "entire length", the depth of the first stage of the hole is automatically set as the effective depth based on the result of shape recognition by the recognition unit 22F. In the example of FIG. 8, the tolerance type "no tolerance" is automatically set as the tolerance in the initial designation of the second stage of the hole. Incidentally, the hole diameter of the hole element is included in the shape data D1 or automatically set based on the result of shape recognition by the recognition unit 22F. Furthermore, the attribute setting unit 22C may determine whether the hole is a blind hole or a through hole based on the result of shape recognition by the recognition unit 22F.

The user can select or input hole information in the instruction field F2. Specifically, in the example of FIG. 8, the user can select or input the hole type, the tolerance (for example, a tolerance type and a tolerance zone class), the effective depth, and the surface roughness (for example, the arithmetic average roughness "Ra 1.6") of the inner plane of the precision hole. As a result, the user can change the initial designation. In addition, an update button B1 and a cancel button B2 are displayed at the lower part of the instruction screen. When the user selects the update button B1, the server control unit 22 sets the changed hole information in the shape data D1. On the other hand, when the user selects the cancel button B2, the server control unit 22 closes the instruction screen. Incidentally, In FIG. 8, the user can select the hole information in the form of a drop-down menu. However, on the instruction screen, the user may be able to input the hole information by using a numeric keypad, for example.

Figure 9:
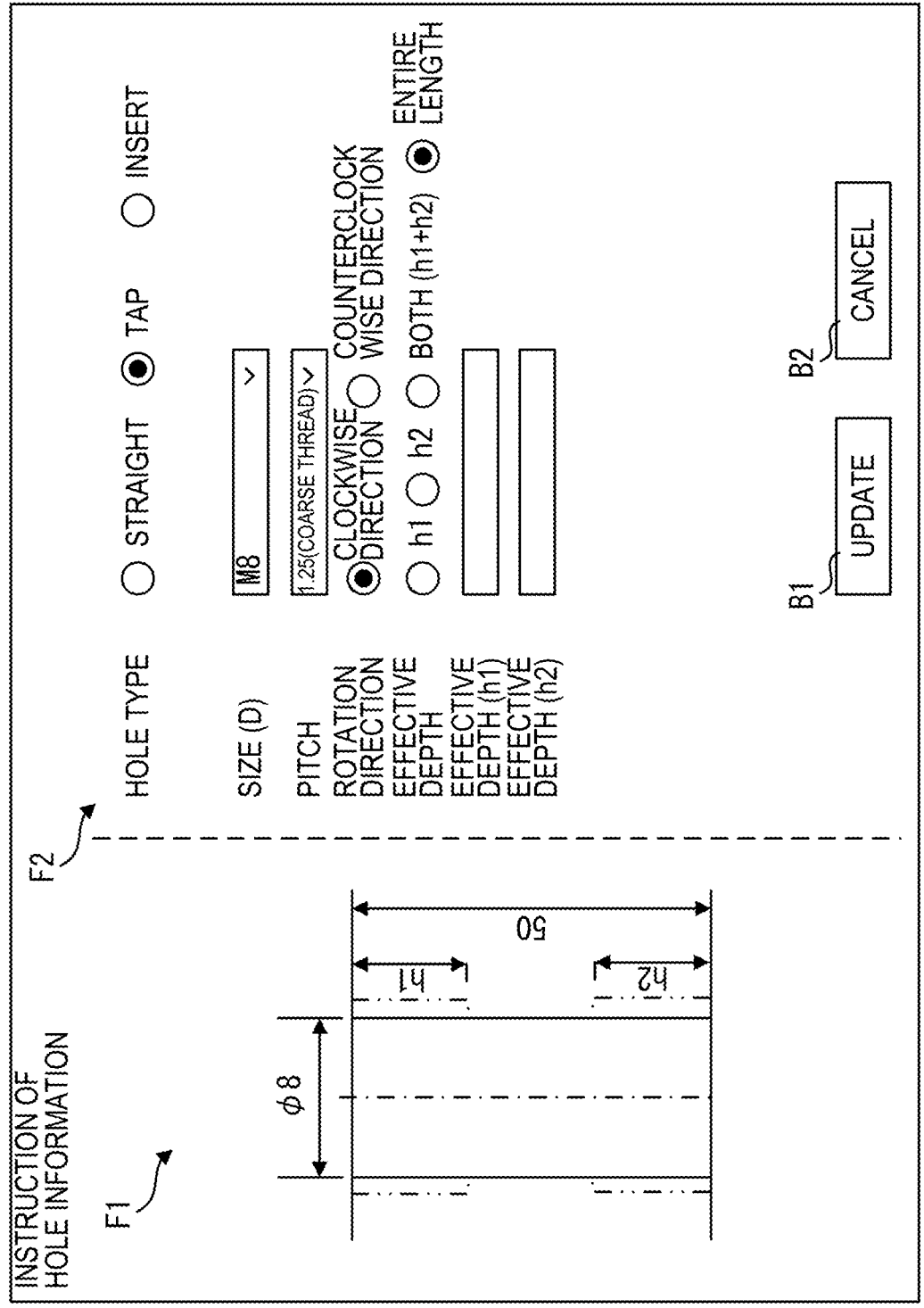
FIG. 9 is a schematic diagram illustrating an example of an instruction screen of a tap hole.

FIG. 9 illustrates an instruction screen for a tap hole. When the hole type of the tap hole is set, the hole type set by the attribute setting unit 22C (the tap hole in the example of FIG. 9) is automatically set in the instruction field F2. In addition, a size in the initial designation (size "M8" according to the JIS standard in the example of FIG. 9) and a pitch in the initial designation (pitch "1.25" of a coarse thread in the example of FIG. 9) are automatically set. Further, the rotation direction of the thread in the initial designation (clockwise direction in the example of FIG. 9) and the effective depth of the initial designation ("entire length" in the example of FIG. 9) are automatically set. Incidentally, when the hole is a blind hole, if the effective depth is the "entire length", the depth of the first stage of the hole is automatically set as the effective depth based on the result of shape recognition by the recognition unit 22F. In addition, an update button B1 and a cancel button B2 are displayed at the lower part of the instruction screen for the tap hole. Similarly in the case of the tap hole, the user can select or input the hole information in the instruction field F2.

Figure 10:
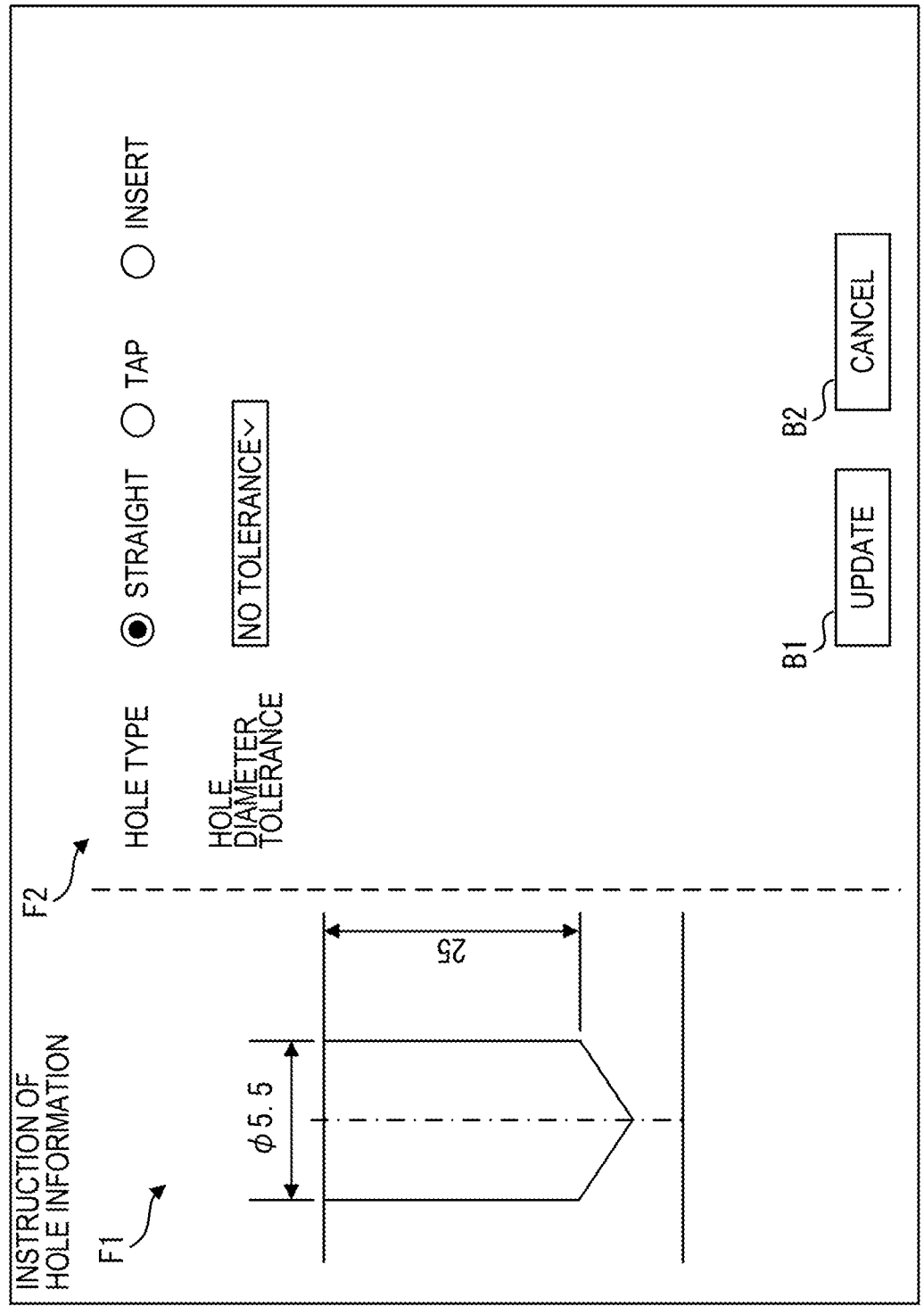
FIG. 10 is a schematic diagram illustrating an example of an instruction screen of a drill hole.

FIG. 10 illustrates an instruction screen for a drill hole. As an example, when the shape recognition mode is selected, and the surface information is not assigned to the hole element, the attribute setting unit 22C sets the hole type of the drill hole. Incidentally, the attribute setting unit 22C may set the hole type of the drill hole when the hole element does not correspond to the precision hole, the tap hole, the insert hole, the countersunk hole, or the stepped hole. When the hole type of the drill hole is set, the hole type set by the attribute setting unit 22C (the straight hole in the example of FIG. 10) is automatically set in the instruction field F2. Further, a tolerance in the initial designation (a tolerance type "no tolerance" in the example of FIG. 10) is automatically set. In addition, an update button B1 and a cancel button B2 are displayed at the lower part of the instruction screen for the drill hole. Similarly in the case of the drill hole, the user can select or input the hole information in the instruction field F2.

Figure 11:
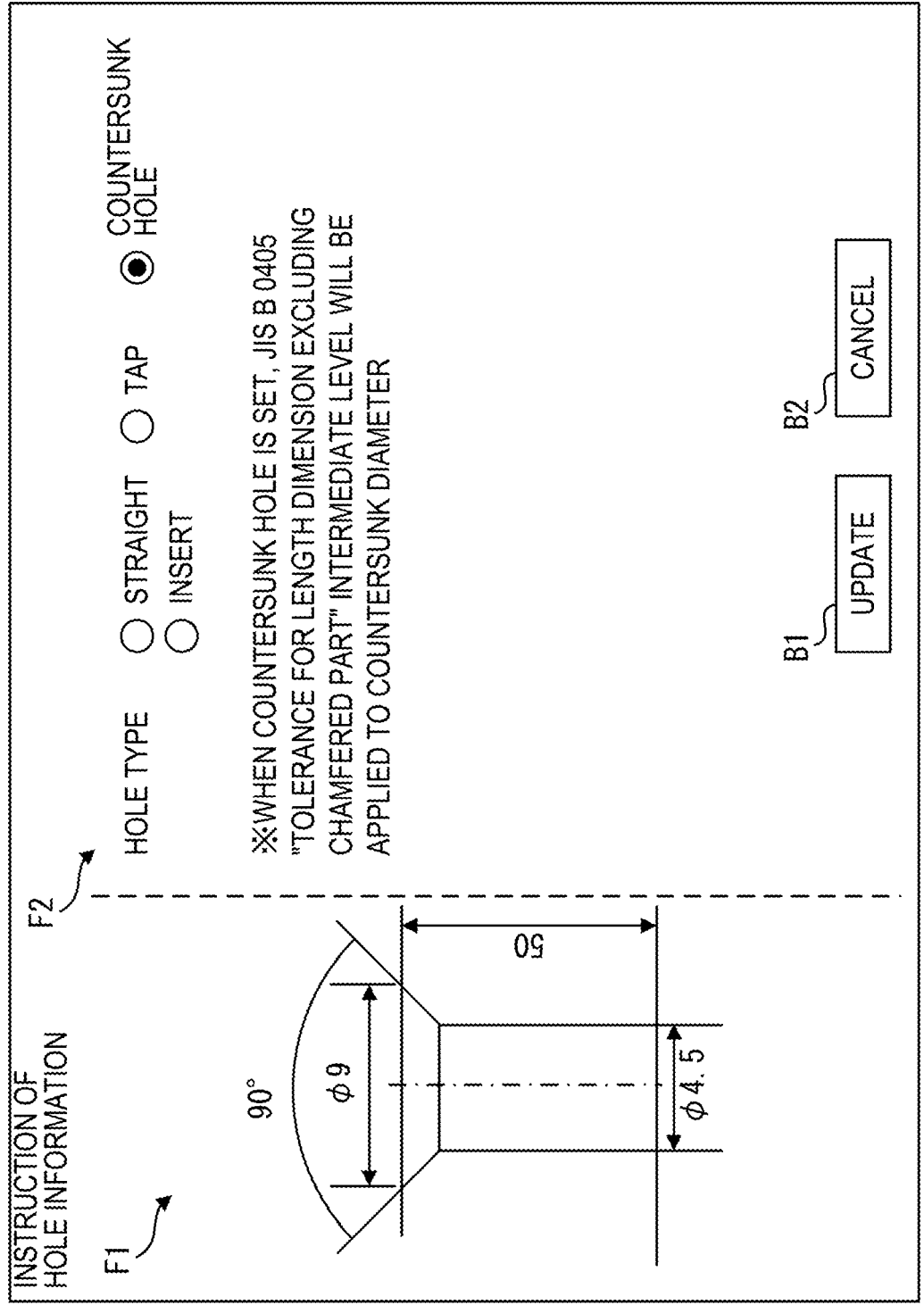
FIG. 11 is a schematic diagram illustrating an example of an instruction screen of a countersunk hole.

FIG. 11 illustrates an instruction screen for a countersunk hole. As an example, when the shape recognition mode is set and the inlet of the hole element has a truncated cone shape, the attribute setting unit 22C sets the hole type of the countersunk hole. When the hole type of the countersunk hole is set, the hole type set by the attribute setting unit 22C (the countersunk hole in the example of FIG. 11) is automatically set in the instruction field F2. Incidentally, in FIG. 11, the angle of the truncated cone (or the conical shape) is 90°. However, the angle may be able to be selected or input by the user on the instruction screen of the countersunk hole.

When the user instructs the hole information on the instruction screen, the server control unit 22 changes the shape data D1 to include the hole information and stores the shape data D1 in the server memory 23. Then, the data acquisition unit 22A acquires the shape data D1 including the hole information from the server memory 23. Then, the generation unit 22G executes the generation process of generating an article image. Incidentally, for another hole type, for example, a counterbore hole which is a stepped hole, the user can instruct the hole information (for example, the tolerance and the hole type) on the instruction screen.

Returning to FIG. 7, when the user instructs the hole information and confirms the displayed content, the user requests quotation. As an example, when the user selects a quotation icon, a quotation request is transmitted from the client terminal 40 to the server 20. Alternatively, when the user instructs the hole information, the quotation request may be transmitted to the server 20. Upon receiving the quotation request, the quotation unit 22D creates quotation information of the article based on the hole attribute set by the attribute setting unit 22C and the shape data D1. Then, the provision unit 22H causes the display device 46 to display the quotation screen including the quotation information such as the price and the actual work days, and the article image generated by the generation unit 22G.

Further, when the confirm button 14 for quotation is selected, the provision unit 22H causes the total monetary amount, the ship date, and the number of actual work days required until shipment to be displayed, as the quotation confirmation information. Then, when the user selects the order button 18 on the quotation screen and proceeds to order, the quotation unit 22D of the server 20 executes the order placement process, and the server control unit 22 causes the display device 46 to display the order screen. Then, when the user places an order for the article, the quotation unit 22D transmits the specified model number and purchase quantity to the manufacturer.

According to the quotation system 100 according to the first embodiment described above, the hole type can be automatically set based on the shape data D1 received from the client terminal 40 of the user. Therefore, since the user does not need to set the hole type, it is possible to shorten the time required for quotation by omitting the hole type setting step. In addition, by using the association information D2 in which the surface information and the hole attribute are associated with each other for each user, the user can create or change the association information D2 without the consent of the manufacturer. Therefore, the user can freely set the surface information used when the user creates the shape data D1, for example, the color. Therefore, for example, software used for creating the shape data D1 is not limited, and versatility can be enhanced.

Incidentally, when the hole attribute (for example, the hole type) is set in the shape data D1 uploaded by the user, the attribute setting unit 22C may automatically replace the original hole attribute by the setting process. Furthermore, the provision unit 22H may notify the user when the detection unit 22B detects the hole element to which the surface information is not assigned. As an example, the provision unit 22H issues the notification by displaying the instruction screen of the hole information to prompt the user to instruct the hole attribute.

Second Embodiment

A second embodiment will be described with reference to FIG. 12. The second embodiment is different from the first embodiment in that the provision unit 22H functions as a notification section that notifies a user. The quotation program PG stored in the server memory 23 causes the server control unit 22, which is a computer, to function as the provision unit 22H, which is the notification section. That is, the server control unit 22 includes the notification section as a logical device realized by a combination of computer hardware and software.

Incidentally, in the description of the second embodiment, differences from the first embodiment will be described. The already described components are denoted by the same reference signs, and the description thereof will be omitted. Unless otherwise described, the components denoted by the same reference signs exhibit substantially the same operation and function, and the functions and effects thereof are also substantially the same.

In the second embodiment, when the hole attribute corresponding to the surface information detected by the detection unit 22B satisfies a non-compatible condition, the provision unit 22H also functions as the notification section that notifies the user that the hole attribute satisfies the non-compatible condition. As an example, when different colors are set for each stage of the hole element including a plurality of stages, the provision unit 22H determines that the non-compatible condition is satisfied. That is, when the surface information corresponding to the hole attributes different from each other is set in the hole element including the plurality of steps, the provision unit 22H determines that the non-compatible condition is satisfied.

As a specific example, in a stepped hole of two stages, the color (for example, red) set in the upper stage may correspond to a tap hole for a coarse thread, and the color (for example, black) set in the lower stage may correspond to a tap hole for a fine thread. In this case, the hole element according to the order content by the user can be formed. However, since the screw does not match with the upper stage of the thread or the lower stage of the thread, the user cannot use the machined article. Therefore, the provision unit 22H notifies the user that the non-compatible condition is satisfied, and gives the user an opportunity to review the condition. Incidentally, in addition to the above description, when the combination of the upper stage and the lower stage is a combination of the tap hole for the coarse thread and the tap hole for the fine thread, a combination of a tap hole and an insert hole, or a combination of a tap hole and a precision hole, or a reverse combination thereof, the provision unit 22H determines that the non-compatible condition is satisfied.

Furthermore, when it is determined that the non-compatible condition is satisfied, the provision unit 22H notifies the user that the non-compatible condition is satisfied. In the example of FIG. 12, the provision unit 22H causes the display device 46 to display character strings of "please confirm conditions" and "this is the hole type including a combination that cannot be supported" as a warning message M1 indicating non-compatibility. As a result, the provision unit 22H notifies the user that the non-compatible condition is satisfied. Alternatively, the provision unit 22H may notify the user by another aspect such as an image or a code. Furthermore, the provision unit 22H may notify the user that the non-compatible condition is satisfied, for example, by sound or by transmitting the warning message M1 to the client terminal 40.

In addition, when the hole attribute set as the non-compatible hole attribute by the supplier coincides with the hole attribute corresponding to the surface information detected by the detection unit 22B, the provision unit 22H may determine that the non-compatible condition is satisfied. For example, the manufacturer selected by the user as a request destination of quotation may set a precision hole as a non-compatible hole attribute. In this case, the provision unit 22H determines that the non-compatible condition is satisfied if the hole attribute corresponding to the surface information detected by the detection unit 22B is the precision hole.

Incidentally, the provision unit 22H may give the user an opportunity to change the setting together with the warning message M1 or before or after the notification of the warning message M1. As an example, the provision unit 22H displays the setting screen of the hole attribute (FIG. 4) to give the user an opportunity to change the surface information associated with the hole attribute. The user performs the change such that different pieces of surface information (for example, red and black) are associated with the same hole attribute (for example, the tap hole for the coarse thread). As a result, the non-compatible condition is not satisfied. Further, the provision unit 22H may display the instruction screen (FIGS. 8 to 11) to give the user an opportunity to change the hole attribute. The user changes the hole attribute (for example, the hole attribute set in the lower stage) set to the hole element to another hole attribute (for example, the tap hole for the coarse thread). As a result, the non-compatible condition is not satisfied.

For example, the provision unit 22H notifies the warning message M1 in the setting process illustrated in FIG. 7. Specifically, the detection unit 22B detects the surface information of the hole element, and the attribute setting unit 22C refers to the association information D2 when the surface information is detected. Thereafter, the attribute setting unit 22C specifies the hole attribute corresponding to the surface information of the hole element detected by the detection unit 22B. Then, the provision unit 22H determines whether or not the hole attribute corresponding to the detected surface information satisfies the non-compatible condition. Here, when the non-compatible condition is satisfied, the provision unit 22H notifies the user of the warning message M1. On the other hand, when the non-compatible condition is not satisfied, the attribute setting unit 22C sets the above hole attribute to the hole element.

Furthermore, the provision unit 22H in the second embodiment also functions as the notification section. When the hole attribute based on the result of the shape recognition process by the recognition unit 22F is different from the hole attribute corresponding to the surface information detected by the detection unit 22B, the notification section notifies the user of such a difference. As an example, the recognition unit 22F recognizes the hole attribute corresponding to the shape of the recognized hole element, as a result of the shape recognition process. Subsequently, the attribute setting unit 22C automatically sets the hole attribute to the hole element. As a result, the hole attribute corresponding to the recognized shape of the hole element is included in the shape data D1.

Thereafter, the attribute setting unit 22C specifies the hole attribute corresponding to the surface information of the hole element detected by the detection unit 22B. Then, the provision unit 22H functions as the notification section. When the hole attribute set based on the result of the shape recognition process is different from the hole attribute corresponding to the detected surface information of the hole element, the notification section notifies the user of such a difference. As an example, the provision unit 22H causes the display device 46 to display a character string "please confirm conditions" as the warning message M1 indicating that the hole attributes are different. As a result, the provision unit 22H notifies the user that the hole attributes are different. Alternatively, the provision unit 22H may notify the user by an image or a code, for example. Furthermore, the provision unit 22H may notify the user that the hole attributes are different, for example, by sound or by transmitting the warning message M1 to the client terminal 40.

For example, the provision unit 22H notifies the warning message M1 in the setting process illustrated in FIG. 7. Specifically, regardless of whether or not the hole attribute setting mode is designated, the recognition unit 22F recognizes the shape of the hole element based on the shape data D1. Then, the recognition unit 22F recognizes the hole attribute corresponding to the shape of the recognized hole element, as a result of the shape recognition process. Subsequently, the attribute setting unit 22C sets this hole attribute to the hole element.

Then, the detection unit 22B detects the surface information of the hole element, and the attribute setting unit 22C refers to the association information D2 when the surface information is detected. Thereafter, the attribute setting unit 22C specifies the hole attribute corresponding to the surface information of the hole element detected by the detection unit 22B. Then, when the hole attribute specified by the attribute setting unit 22C is different from the hole attribute based on the result of the shape recognition process, the provision unit 22H notifies the user of the warning message M1. On the other hand, when both hole attributes coincide with each other, the attribute setting unit 22C sets the specified hole attribute to the hole element.

The quotation system 100 according to the second embodiment described above can also automatically set the hole type based on the shape data D1 received from the client terminal 40 of the user. Furthermore, according to the quotation system 100 according to the second embodiment, when it is predicted that there is an error in assignment of the surface information, it is possible to give the user an opportunity to review. That is, when the non-compatible condition is satisfied, it is predicted that there is an error in the assignment of the surface information. Therefore, the provision unit 22H notifies the user that there is an error in the assignment of the surface information. In addition, when the hole attribute based on the result of the shape recognition process is different from the hole attribute corresponding to the surface information detected by the detection unit 22B, it is predicted that there is an error in the setting. Therefore, the provision unit 22H notifies the user that there is an error in the setting.

Third Embodiment

A third embodiment will be described with reference to FIG. 13. The third embodiment is different from the first embodiment in that the attribute setting unit 22C proposes designation of surface information to be corresponded to the hole attribute to the user. Incidentally, in the description of the third embodiment, differences from the first embodiment will be described. The already described components are denoted by the same reference signs, and the description thereof will be omitted. Unless otherwise described, the components denoted by the same reference signs exhibit substantially the same operation and function, and the effects thereof are also substantially the same.

In the third embodiment, when the hole attribute is not associated with the surface information detected by the detection unit 22B, the attribute setting unit 22C proposes designation of the surface information to be corresponded to the hole attribute to the user. As an example, in case of that the hole attribute corresponding to the detected surface information of the hole element is not included in the association information D2 when referring to the association information D2, the attribute setting unit 22C determines that the hole attribute is not associated with the surface information. Then, the attribute setting unit 22C proposes the designation of the surface information to be corresponded to the hole attribute to the user. Thereafter, the user performs an operation of displaying the setting screen (FIG. 4), and designates the surface information such that a desired hole attribute is associated. Alternatively, the attribute setting unit 22C may automatically display the setting screen.

In the example of FIG. 13, the attribute setting unit 22C displays a character string "[R: 148, G: 63, B: 175] is set for the hole color. If you want to automatically set the hole type, register the color on the setting screen." on the display device 46 as a proposal message M2 for designation of the surface information. As a result, the attribute setting unit 22C proposes the designation of the surface information to be corresponded to the hole attribute to the user. Alternatively, the attribute setting unit 22C may make a proposal to the user by an image or a code, for example. Further, the attribute setting unit 22C may propose the designation of the surface information to the user, for example, by sound or by transmitting the proposal message M2 to the client terminal 40.

In addition, the attribute setting unit 22C notifies the user of the surface information with which the hole attribute is not associated and which is assigned to the hole element, together with the proposal for the designation of the surface information, or before or after the proposal for the designation of the surface information. In the example of FIG. 13, information "R: 148, G: 63, B: 175" indicating the color of the hole is included in the proposal message M2 as the surface information. Alternatively, the attribute setting unit 22C may display the surface information separately from the proposal message M2. Furthermore, the attribute setting unit 22C may notify the user by an image or a code, for example. Furthermore, the attribute setting unit 22C may notify the user of the surface information, for example, by sound or by transmitting the surface information to the client terminal 40.

Further, the attribute setting unit 22C notifies the user of the surface information that is associated with the hole attribute, together with the proposal for the designation of the surface information, or before or after the proposal for the designation of the surface information. The attribute setting unit 22C may issue a notification in accordance with an operation of the user who instructs confirmation of the surface information, or may automatically issue a notification even without the operation of the user. In the example of FIG. 13, the attribute setting unit 22C displays a list of designated colors as a color notification message M3 indicating the surface information. As a result, the attribute setting unit 22C notifies the user of the surface information associated with the hole attribute. Alternatively, the attribute setting unit 22C may notify the user by an image or a code, for example. Further, the attribute setting unit 22C may notify the user of the surface information, for example, by sound or by transmitting the designated surface information to the client terminal 40.

For example, the provision unit 22H notifies the proposal message M2 in the setting process illustrated in FIG. 7. Specifically, the detection unit 22B detects the surface information of the hole element, and the attribute setting unit 22C refers to the association information D2 when the surface information is detected. Then, when the hole attribute is not associated with the surface information detected by the detection unit 22B, the attribute setting unit 22C proposes designation of the surface information to be corresponded to the hole attribute to the user. On the other hand, when the hole attribute is associated, the attribute setting unit 22C specifies the hole attribute corresponding to the surface information of the hole element detected by the detection unit 22B, and sets the specified hole attribute to the hole element.

The quotation system 100 according to the third embodiment described above can also automatically set the hole type based on the shape data D1 received from the client terminal 40 of the user. Furthermore, according to the quotation system 100 according to the third embodiment, when there is omission in the designation of the surface information, it is possible to prompt the user to designate the surface information. Furthermore, when there is not omission in the designation of the surface information but an error in the assignment of the surface information, it is possible to give the user an opportunity to review.

Hitherto, the present invention has been described with reference to the embodiments, but the present invention is not limited to the above embodiments. Inventions modified within a range without contradictory to the present invention and inventions equivalent to the present invention are also included in the present invention. In addition, each embodiment and each modification can be appropriately combined within a range without contradictory to the present invention.

For example, the system including the server 20 can be used for purposes other than the quotation. As an example, a system including the server 20 may be used in the design of an article. Even in this case, it is possible to omit the setting of the hole attribute in the design of the article using the shape data D1.

The quotation system 100 may further include the client terminal 40. In this case, at least a part of each section included in the server control unit 22 may be provided in the terminal control unit 45 of the client terminal 40. As an example, at least one of the data acquisition unit 22A, the detection unit 22B, the attribute setting unit 22C, the quotation unit 22D, the reception unit 22E, the recognition unit 22F, the generation unit 22G, and the provision unit 22H may be provided in the terminal control unit 45. For example, the client terminal 40 receives the shape data D1 input by the user and stores the shape data D1 in the terminal memory 44. Then, the data acquisition unit 22A of the terminal control unit 45 acquires the shape data D1 from the terminal memory 44. Further, the attribute setting unit 22C of the terminal control unit 45 executes the setting process based on the association information D2 stored in the terminal memory 44.

Furthermore, the user may be able to change the shape or dimension of the article on the web page provided by the server control unit 22. In this case, the server control unit 22 reflects the change by the user in the shape data D1 and stores the shape data D1 in the server memory 23. Then, the data acquisition unit 22A acquires the shape data D1 reflecting the change from the server memory 23. Further, the quotation system 100 may be configured so that the surface information can be assigned to the hole element on the screen provided by the server 20.

REFERENCE SIGNS LIST 22 server control unit (computer)
22A data acquisition unit (data acquisition section)
22B detection unit (detection section)
22C attribute setting unit (attribute setting section)
22D quotation unit (quotation section)
22E reception unit (reception section)
22F recognition unit (shape recognition section)
22G generation unit (image generation section)
22H provision unit (provision section, notification section)
40 client terminal
100 quotation system
D1 shape data
D2 association information
D3 setting information
PG quotation program

The invention claimed is:
1. A quotation system comprising:
a processor that is configured to:
acquire shape data of an article including a hole element, to which surface information is assigned by a user, from a client terminal of the user, said surface information of the hole element indicating a color or a texture;

detect the surface information of the hole element indicating the color or the texture among pieces of information assigned to the shape data;

set a hole attribute corresponding to the detected surface information to the hole element with reference to association information in which the surface information that is able to be assigned to the shape data and the hole attribute indicating an attribute of the hole element are associated for each user;

create quotation information of the article based on the set hole attribute and the shape data; and provide the quotation information to the client terminal.

2. The quotation system according to claim 1, wherein the processor receives designation of the surface information of the hole element to be corresponded to each of a plurality of the hole attributes from the client terminal, and creates the association information associated with user identification information for identifying each user.

3. The quotation system according to claim 1, wherein the processor executes a shape recognition process of the article based on the shape data, the processor sets the hole attribute corresponding to the detected surface information to the hole element when a hole attribute setting mode for setting the hole attribute by the surface information is designated, and the processor sets the hole attribute based on a result of the shape recognition process to the hole element when the hole attribute setting mode is not designated.

4. The quotation system according to claim 1, wherein the surface information indicates the color or the texture set on a surface of the hole element.

5. The quotation system according to claim 1, wherein the processor generates an article image in which the set hole attribute is expressed on the hole element of a three-dimensional model of the article based on the set hole attribute and the shape data, and the processor provides the client terminal with the quotation information and the article image.

6. The quotation system according to claim 5, wherein the processor generates the article image so as to express a color or a texture corresponding to the hole attribute on the hole element with reference to setting information in which the color or the texture to be set for a surface of the hole element of the article image is associated with the hole attribute.

7. The quotation system according to claim 1, wherein the processor notifies the client terminal when the hole attribute corresponding to the detected surface information satisfies a non-compatible condition.

8. The quotation system according to claim 1, wherein the processor executes a shape recognition process of the article based on the shape data, and the processor notifies the client terminal when the hole attribute based on a result of the shape recognition process is different from the hole attribute corresponding to the detected surface information.

9. The quotation system according to claim 1, wherein the processor proposes, to the client terminal, designation of the surface information to be corresponded to the hole attribute when the hole attribute is not associated with the detected surface information.

10. A non-transitory computer-readable storage medium storing a quotation program of a quotation system that includes a processor, the quotation program causing the processor to:

acquire shape data of an article including a hole element, to which surface information is assigned by a user, from a client terminal of the user, said surface information of the hole element indicating a color or a texture;

detect the surface information of the hole element indicating the color or the texture among pieces of information assigned to the shape data;

set a hole attribute corresponding to the detected surface information to the hole element with reference to association information in which the surface information that is able to be assigned to the shape data and the hole attribute indicating an attribute of the hole element are associated for each user;

create quotation information of the article based on the set hole attribute and the shape data; and provide the quotation information to the client terminal.

11. A control method of a quotation system having a processor, the control method comprising the processor-caused steps of:

acquiring shape data of an article including a hole element, to which surface information is assigned by a user, from a client terminal of the user, said surface information of the hole element indicating a color or a texture;

detecting the surface information of the hole element indicating the color or the texture among pieces of information assigned to the shape data;

setting a hole attribute corresponding to the detected surface information to the hole element with reference to association information in which the surface information that is able to be assigned to the shape data and the hole attribute indicating an attribute of the hole element are associated for each user;

creating quotation information of the article based on the set hole attribute and the shape data; and providing the quotation information to the client terminal.

* * * * *